(12) United States Patent
Park et al.

(10) Patent No.: US 12,505,954 B2
(45) Date of Patent: Dec. 23, 2025

(54) MULTILAYER CERAMIC CAPACITOR

(71) Applicant: SAMSUNG ELECTRO-MECHANICS CO., LTD., Suwon-si (KR)

(72) Inventors: Cheolwoo Park, Suwon-si (KR); Seungjin Park, Suwon-si (KR); Junil Kang, Suwon-si (KR)

(73) Assignee: SAMSUNG ELECTRO-MECHANICS CO., LTD., Suwon-si (KR)

(*) Notice: Subject to any disclaimer, the term of this patent is extended or adjusted under 35 U.S.C. 154(b) by 130 days.

(21) Appl. No.: 18/596,102

(22) Filed: Mar. 5, 2024

(65) Prior Publication Data
US 2025/0166906 A1 May 22, 2025

(30) Foreign Application Priority Data
Nov. 16, 2023 (KR) .................. 10-2023-0159022

(51) Int. Cl.
| | |
|---|---|
| H01G 4/12 | (2006.01) |
| H01G 4/232 | (2006.01) |
| H01G 4/248 | (2006.01) |
| H01G 4/30 | (2006.01) |

(52) U.S. Cl.
CPC ........... *H01G 4/1227* (2013.01); *H01G 4/232* (2013.01); *H01G 4/248* (2013.01); *H01G 4/30* (2013.01)

(58) Field of Classification Search
CPC ...... H01G 4/1227; H01G 4/232; H01G 4/248; H01G 4/30; H01G 4/012; H01G 4/12; H01G 4/2325; C04B 35/4668; Y02E 60/13
See application file for complete search history.

(56) References Cited

U.S. PATENT DOCUMENTS

| | | | | |
|---|---|---|---|---|
| 2016/0372255 A1* | 12/2016 | Maki | ...................... | H01F 41/041 |
| 2018/0286591 A1* | 10/2018 | Kim | ........................ | H01G 4/12 |
| 2020/0066449 A1 | 2/2020 | Tsutsumi et al. | | |
| 2025/0166906 A1* | 5/2025 | Park | ........................ | H01G 4/12 |

FOREIGN PATENT DOCUMENTS

| | | | | |
|---|---|---|---|---|
| JP | 2021141323 A | * 9/2021 | ............... | H01G 4/30 |
| KR | 10-2016-0148459 A | 12/2016 | | |
| KR | 20190006060 A | * 1/2019 | ............. | H01G 13/00 |
| WO | 2018/220901 A1 | 12/2018 | | |

* cited by examiner

*Primary Examiner* — Dion R. Ferguson
(74) *Attorney, Agent, or Firm* — Morgan Lewis & Bockius LLP

(57) ABSTRACT

The disclosed multilayer ceramic capacitor may include: a ceramic main body; an internal electrode disposed inside the ceramic main body; and an external electrode including a plating layer that contacts a surface of the ceramic main body and is connected to the internal electrode, in which a micro crack exists inward from a surface of the ceramic main body where the plating layer is in contact, and the micro crack may be filled with a metal that comprises the plating layer, and the surface of the ceramic main body, which is in contact with the plating layer, may include an amorphous structure.

14 Claims, 12 Drawing Sheets

A

B

MULTILAYER CERAMIC CAPACITOR

CROSS-REFERENCE TO RELATED APPLICATION

The present application claims the benefit of priority to Korean Patent Application No. 10-2023-0159022, filed on Nov. 16, 2023 in the Korean Intellectual Property Office, the entire contents of which are incorporated herein by reference.

TECHNICAL FIELD

The present disclosure relates to a multilayer ceramic capacitor.

BACKGROUND

Electronic components, which use ceramic materials include capacitors, inductors, piezoelectric elements, varistors, thermistors, or the like. Among these ceramic electronic components, a multilayer ceramic capacitor (MLCC) may be used in various electronic devices due to its merits of being small, ensuring a high capacity, and being easy to mount.

For example, the multilayer ceramic capacitor may be used for chip-type condensers mounted on boards of various electronic products such as imaging devices such as liquid crystal display (LCD) devices, plasma display panel (PDP) devices, and organic light-emitting diodes (OLEDs), computers, personal portable terminals, and smartphones and configured to charge the electronic products with electricity or discharge the electronic products.

A multilayer ceramic capacitor may include an internal electrode disposed inside a ceramic main body and an external electrode disposed outside the ceramic main body and connected to the internal electrode. In general, the external electrode includes a base electrode formed by dipping and blotting the ceramic main body to a conductive paste and a plating layer that covers the base electrode. In this case, there is a problem that it is difficult to reduce the volume occupied by the external electrode.

It is possible to form a metal thin film on a surface of the ceramic main body and use the metal thin film as a seed layer to grow a plating layer, but there is a problem that the seed layer may peel off or fall off during the plating process, resulting in poor plating.

SUMMARY

One aspect of an embodiment is to provide a multilayer ceramic capacitor that includes an external electrode with reduced volume.

Another aspect of the embodiment is to provide a multilayer ceramic capacitor that includes an external electrode with a plating layer that is strongly bonded to a ceramic main body.

However, the challenges that embodiments of the present invention seek to solve are not limited to the above-mentioned challenges and can be expanded in various ways within the range of technical ideas included in the present invention.

A multilayer ceramic capacitor according to an embodiment includes: a ceramic main body; an internal electrode disposed inside the ceramic main body; and an external electrode including a plating layer that contacts a surface of the ceramic main body and is connected to the internal electrode, wherein a micro crack exists inward from the surface of the ceramic main body where the plating layer is in contact, and the micro crack may be filled with a metal that comprises the plating layer, and the surface of the ceramic main body, which is in contact with the plating layer, may include an amorphous structure.

In one embodiment, the surface of the ceramic main body, which is in contact with the plating layer, may include a curved portion.

In one embodiment, the curved portion comprises a pattern of irregularities including repeating valleys and ridges, and an average period of the valleys or the ridges may be 0.1 um or more and 8 μm or less and an average amplitude may be 0.01 um or more and 1 μm or less.

In one embodiment, the curved portion may include valleys and ridges, and the micro crack may exist in the ridges.

In one embodiment, a depth of the micro crack may be 10 nm or more and 1000 nm or less.

In one embodiment, the ceramic main body may include barium (Ba) and titanium (Ti), and a ratio (Ba/Ti) of the content of titanium (Ti) to the content of titanium (Ti) in the amorphous structure may be smaller than a ratio (Ba/Ti) of the content of barium (Ba) to the content of titanium (Ti) in the remaining regions.

In one embodiment, electrical resistance of the surface of the ceramic main body that is in contact with the plating layer may be smaller than electrical resistance of a surface that is not in contact with the plating layer.

In one embodiment, a ratio of the electrical resistance of the surface of the ceramic main body that is in contact with the plating layer to the electrical resistance of the ceramic surface that is not in contact with the plating layer may be greater than or equal to $1/10_4$ and less than 1.

In one embodiment, the curved portion may include valleys and ridges, and electrical resistance of the ridges may be smaller than electrical resistance of the valleys.

In one embodiment, a thickness of the plating layer may be greater than 0 um and less than or equal to 1 um.

In one embodiment, the surface of the ceramic main body that is in contact with the plating layer may include a laser irradiation region having a certain depth, and a surface of the ceramic main body that is not in contact with the plating layer may include a laser non-irradiated region.

In one embodiment, electrical resistance of the laser irradiation region may be smaller than electrical resistance of the laser non-irradiated region.

In one embodiment, the ceramic main body may include barium (Ba) and titanium (Ti), and a ratio (Ba/Ti) of the content of titanium (Ti) to the content of titanium (Ti) in the amorphous structure in the laser irradiation region may be smaller than a ratio (Ba/Ti) of the content of barium (Ba) to the content of titanium (Ti) in the laser non-irradiated region.

In one embodiment, the laser irradiation region may include an outer layer portion and an inner layer portion, the outer layer portion may be a portion that forms an external surface of the laser irradiation region and is in contact with the plating layer, the micro crack may exist in the outer layer portion, the inner layer portion may be a portion that forms an internal surface of the laser irradiation region and is in contact with the laser non-irradiated region, and no micro crack may exist in the inner layer portion.

In the multilayer ceramic capacitor according to the embodiment, by reducing the volume of the external electrode, a portion contributing to capacitance can be made larger.

In addition, in the multilayer ceramic capacitor according to the embodiment, the plating layer of the external electrode can be strongly bonded to the ceramic main body.

DETAILED DESCRIPTION OF THE EMBODIMENTS

Figure 1:
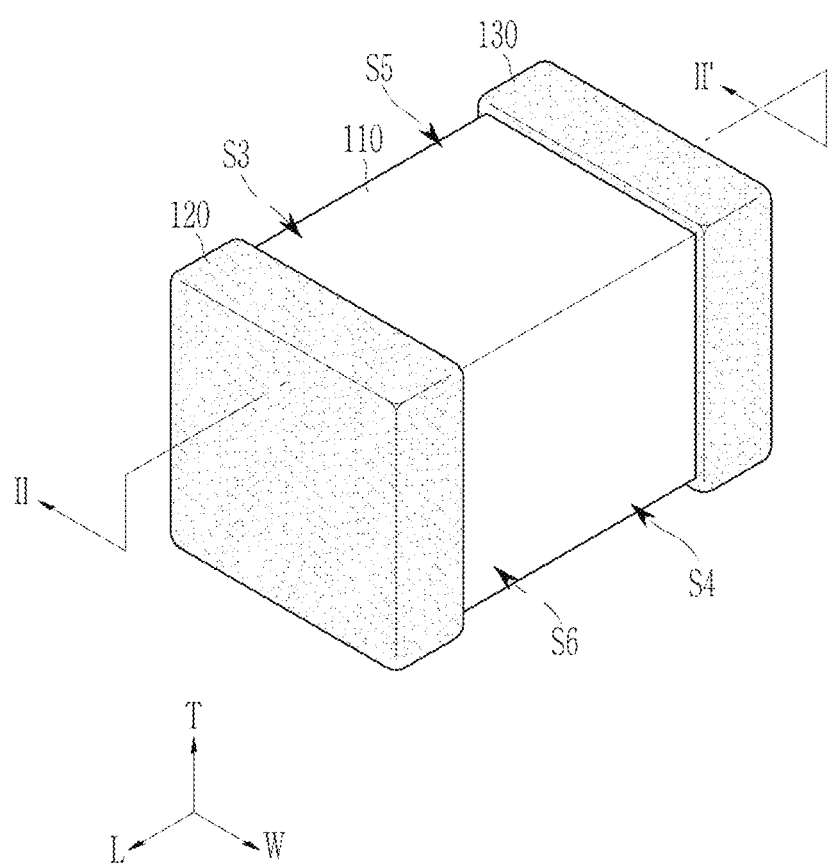
FIG. 1 is a schematic perspective view of a multilayer ceramic capacitor according to an embodiment.

Hereinafter, with reference to the accompanying drawing, an embodiment will be described in detail and thus a person of an ordinary skill can easily practice it in the technical field to which the present invention belongs. The drawings and description are to be regarded as illustrative in nature and not restrictive. Like reference numerals designate like elements throughout the specification. In addition, some constituent elements in the accompanying drawings are exaggerated, omitted, or schematically illustrated, and the size of each constituent element does not fully reflect the actual size.

The accompanying drawing is only for easy understanding of the embodiments disclosed in this specification, and the technical idea disclosed in this specification is not limited by the accompanying drawing, and it should be understood that all changes, equivalents, or substitutes included in the spirit and scope of the present invention are included.

Terms including ordinal numbers such as first, second, and the like may be used to describe elements of various configurations, but the constituent elements are not limited by the terms. The terms are used only for the purpose of distinguishing one constituent element from other constituent elements.

It will be understood that when an element such as a layer, film, region, or substrate is referred to as being "on" another element, it can be directly on the other element or intervening elements may also be present. In contrast, when an element is referred to as being "directly on" another element, there are no intervening elements present. Further, throughout the specification, the word "on" a target element will be understood to be positioned above or below the target element, and will not necessarily be understood to be positioned "at an upper side" based on an opposite to gravity direction.

In the present specification, terms such as "include" or "have" are intended to designate the existence of features, numbers, steps, actions, constituent elements, parts, or a combination of them described in the specification, and thus it is to be understood that the possibility of the presence or addition of one or more other features, elements, numbers, steps, actions, constituent elements, parts, or combinations thereof, is not preliminarily excluded. In addition, unless explicitly described to the contrary, the word "comprise" will be understood to imply the inclusion of other constituent elements but not the exclusion of any other constituent elements.

Further, throughout the specification, the phrase "on a plane" means viewing a target portion from the top, and the phrase "on a cross-section" means viewing a cross-section formed by vertically cutting a target portion from the side.

In addition, when "connected to" in the entire specification, this does not only mean that two or more constituent elements are directly connected, but also means that two or more constituent elements are indirectly connected, physically connected, and electrically connected through other constituent elements, or being referred to by different names depending on the position or function, while being integral.

Figure 2:
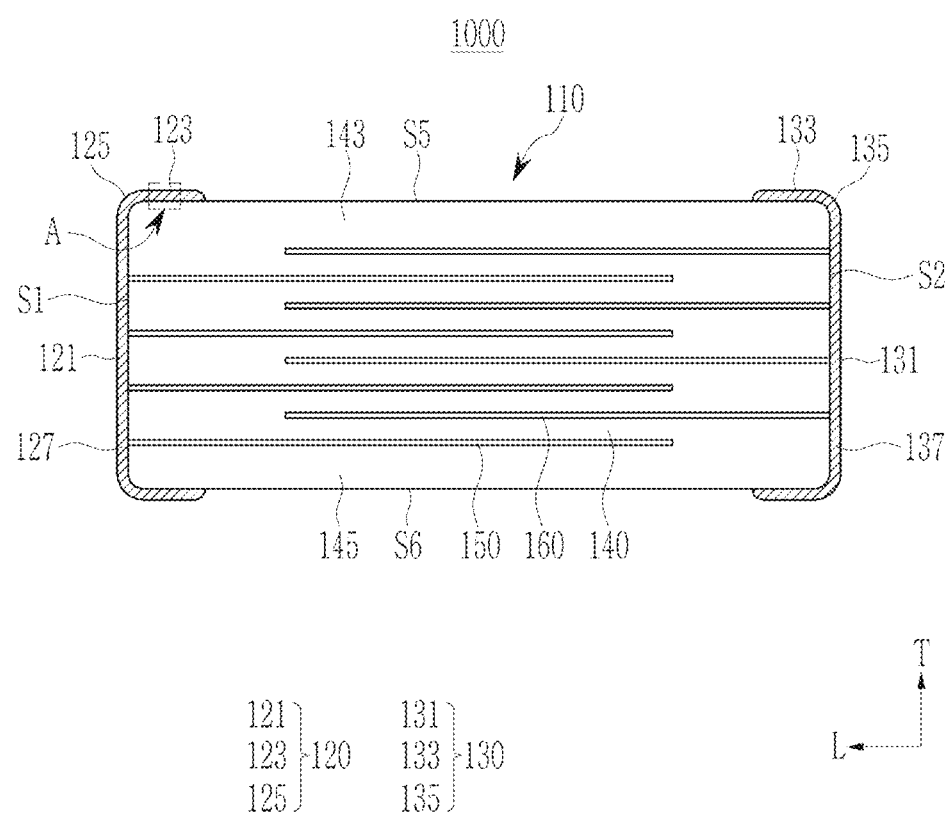
FIG. 2 is a cross-sectional view of FIG. 1, taken along line II-II'.
Figure 3:
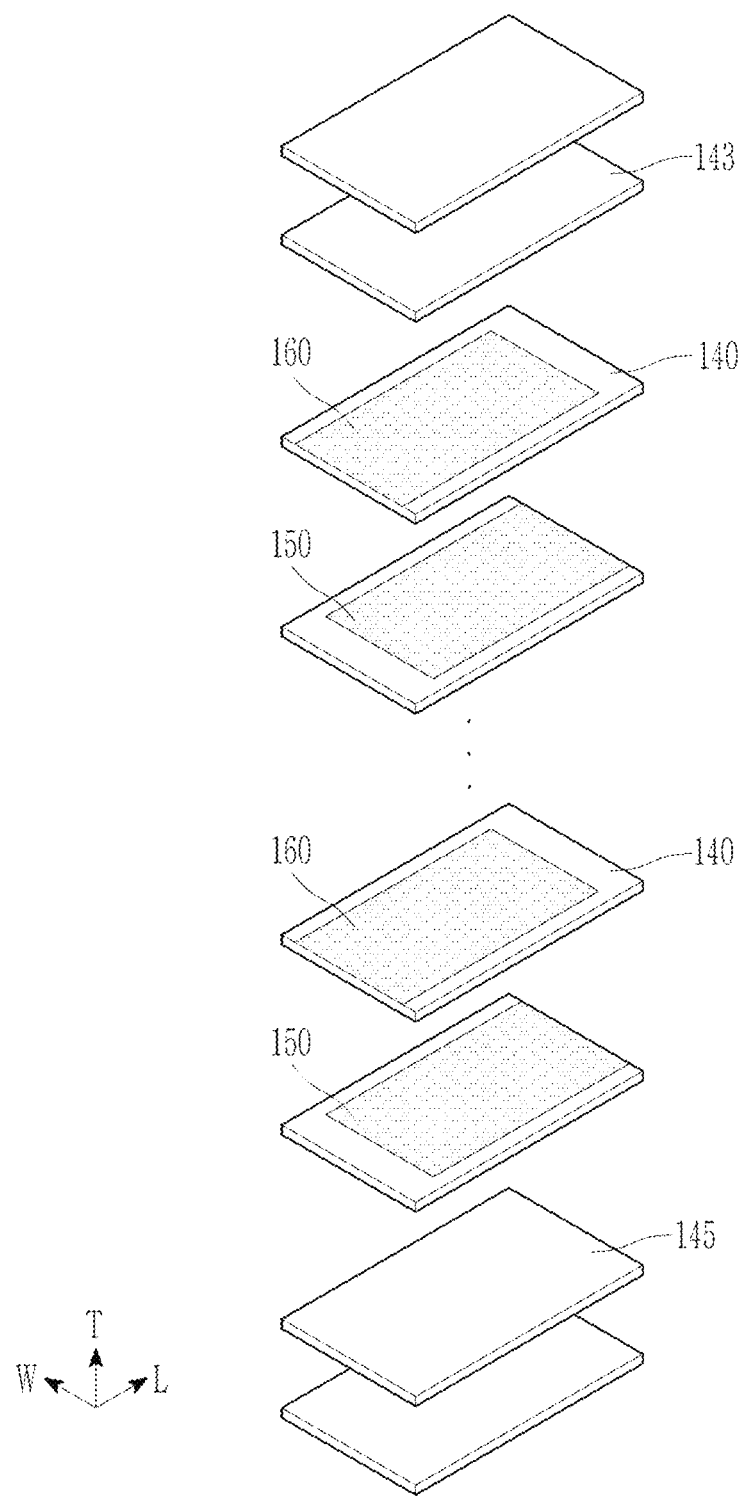
FIG. 3 is an exploded perspective view of a multilayer structure of an internal electrode in the multilayer ceramic capacitor of FIG. 1.

FIG. 1 is a schematic perspective view of a multilayer ceramic capacitor according to an embodiment, FIG. 2 is a cross-sectional view of FIG. 1, taken along line II-II', and FIG. 3 is an exploded perspective view of a multilayer structure of an internal electrode in the multilayer ceramic capacitor of FIG. 1.

Referring to FIG. 1, FIG. 2, and FIG. 3, a multilayer ceramic capacitor 1000 according to the present embodiment includes a ceramic main body 110, a first external electrode 120, a second external electrode 130, a plurality of first internal electrodes 150, and a plurality of second internal electrodes 160.

First, to clearly describe the present embodiment, the L-axis, W-axis, and T-axis shown in the drawing refer to the axes representing the length direction, width direction, and thickness direction of the multilayer ceramic capacitor 1000, respectively.

The thickness direction (T-axis direction) may be a direction perpendicular to wide surfaces (main surfaces) of constituent elements having sheet shapes. For example, the thickness direction (T-axis direction) may be used as the same concept as the direction in which a dielectric layer 140 is laminated.

The length direction (L-axis direction) may be a direction parallel to wide surfaces (main surfaces) of constituent elements having sheet shapes, i.e., a direction intersecting (or orthogonal to) the thickness direction (T-axis direction). For example, the length direction (L-axis direction) may be a direction in which the first external electrode 120 and the second external electrode 130 face each other.

The width direction (W-axis direction) may be a direction parallel to wide surfaces (main surfaces) of constituent elements having sheet shapes, i.e., a direction simultaneously intersecting (or orthogonal to) the thickness direction (T-axis direction) and the length direction (L-axis direction).

The ceramic main body 110 may have an approximately hexahedral shape, but the present embodiment is not limited thereto. Due to shrinkage during sintering, the ceramic main body 110 may not have a fully hexahedral shape, but may have a substantially hexahedral shape. For example, the ceramic main body 110 has an approximately cuboidal shape, but the corners or vertices may have a round shape.

In the present embodiment, for convenience of description, surfaces of the ceramic main body 110, which each other in the length direction (L-axis direction) are respectively defined as a first surface S1 and a second surface S2. Surfaces of the ceramic main body 110, which face each other in the width direction (W-axis direction) and connect the first surface S1 and the second surface S2 are respectively defined as a third surface S3 and a fourth surface S4. Surfaces of the ceramic main body 110, which face each other in the thickness direction (T-axis direction) and connect the first surface S1 and the second surface S2 are respectively defined as a fifth surface S5 and a sixth surface S6.

Thus, a first direction, which is a direction in which the first surface S1 and the second surface S2 face each other, may be the length direction (L-axis direction), and second and third directions, which are perpendicular to the first direction and perpendicular to each other, may be respectively the thickness direction (T-axis direction) and the width direction (W-axis direction) or the width direction (W-axis direction) and the thickness direction (T-axis direction).

Based on an optical microscope or scanning electron microscope (SEM) image of a cross-section taken in the length direction (L-axis direction) and the thickness direction (T-axis direction) of a central portion of the ceramic main body 110 in the width direction (W-axis direction), a length of the ceramic main body 110 may mean a maximum value among lengths of a plurality of line segments that connects two outermost boundary lines, which are opposite to each other in the length direction (L-axis direction) of the ceramic main body 110 shown in the above-mentioned image of the cross section, and is parallel to the length direction (L-axis direction). Meanwhile, the length of the ceramic main body 110 may mean a minimum value among the lengths of the plurality of line segments that connects the two outermost boundary lines, which are opposite to each other in the length direction (L-axis direction) of the ceramic main body 110 shown in the above-mentioned image of the cross section, and is parallel to the length direction (L-axis direction). On the other hand, the length of the ceramic main body 110 may mean an arithmetic mean value of the lengths of at least two line segments among the lengths of the plurality of line segments that connects the two outermost boundary lines, which are opposite to each other in the length direction (L-axis direction) of the ceramic main body 110 shown in the above-mentioned image of the cross section, and is parallel to the length direction (L-axis direction).

Based an optical microscope or scanning electron microscope (SEM) image of a cross-section taken in the length direction (L-axis direction) and thickness direction (T-axis direction) of a central portion of the ceramic main body 110 in the width direction (W-axis direction), a thickness of the ceramic main body 110 may mean a maximum value among lengths of a plurality of line segments that connects the two outermost boundary lines, which are opposite to each other in the thickness direction (T-axis direction) of the ceramic main body 110 shown in the above-mentioned image of the cross section, and is parallel to the thickness direction (T-axis direction). Meanwhile, the thickness of the ceramic main body 110 may mean a minimum value among the lengths of the plurality of line segments that connects the two outermost boundary lines, which are opposite to each other in the thickness direction (T-axis direction) of the ceramic main body 110 shown in the above-mentioned image of the cross section, and is parallel to the thickness direction (T-axis direction). On the other hand, the length of the ceramic main body 110 may mean an arithmetic mean value of the lengths of at least two line segments among the lengths of the plurality of line segments that connects the two outermost boundary lines, which are opposite to each other in the thickness direction (T-axis direction) of the ceramic main body 110 shown in the above-mentioned image of the cross section, and is parallel to the thickness direction (T-axis direction).

Based on an optical microscope or scanning electron microscope (SEM) image of a cross-section taken in the length direction (L-axis direction) and width direction (W-axis direction) of a central portion of the ceramic main body 110 in the thickness direction (T-axis direction), a width of the ceramic main body 110 may mean a maximum value among lengths of a plurality of line segments that connects the two outermost boundary lines, which are opposite to each other in the width direction (W-axis direction) of the ceramic main body 110 shown in the above-mentioned image of the cross section, and is parallel to the width direction (W-axis direction). Meanwhile, the width of the ceramic main body 110 may mean a minimum value among the lengths of the plurality of line segments that connects the two outermost boundary lines, which are opposite to each other in the width direction (W-axis direction) of the ceramic main body 110 shown in the above-mentioned image of the cross section, and is parallel to the width direction (W-axis direction). On the other hand, the width of the ceramic main body 110 may mean an arithmetic mean value of the lengths of at least two line segments among the lengths of the plurality of line segments that connects the two outermost boundary lines, which are opposite to each other in the width direction (W-axis direction) of the ceramic main body 110 shown in the above-mentioned image of the cross section, and is parallel to the width direction (W-axis direction).

The ceramic main body 110 may include a plurality of dielectric layers 140 stacked in the thickness direction (T-axis direction). Boundaries between dielectric layers 140 may be indistinct. For example, the boundaries between the dielectric layers 140 are difficult to confirm without using a scanning electron microscope (SEM), and the plurality of dielectric layers 140 may appear to be an integral structure.

The first internal electrode 150 and the second internal electrode 160 may be alternately stacked with the dielectric layer 140 interposed therebetween. Such a stacked structure may be repeated within the ceramic main body 110, and the internal electrode closest to the fifth surface S5 of the ceramic main body 110 may be a first internal electrode 150 or a second internal electrode 160. The internal electrode closest to the sixth surface S6 of the ceramic main body 110 may be a first internal electrode 150 or a second internal electrode 160.

The first internal electrode 150 and the second internal electrode 160 have different polarities and may be electrically insulated from each other by the dielectric layer 140 disposed between them.

The first internal electrode 150 and the second internal electrode 160 may be arranged to be offset from each other in the length direction (L-axis direction) with the dielectric layer 140 interposed therebetween. One end of the first internal electrode 150 may be exposed from the first surface S1 of the ceramic main body 110, and one end of the second internal electrode 160 may be exposed from the second surface S2 of the ceramic main body 110. The end of the first internal electrode 150 exposed from the first surface S1 of the ceramic main body 110 may be connected to the first external electrode 120. The end of the second internal electrode 160 exposed from the second surface S2 of the ceramic main body 110 may be connected to the second external electrode 130.

The first internal electrode 150 and the second internal electrode 160 may be formed by printing a conductive paste that includes a conductive metal on the surface of the dielectric layer 140. For example, an internal electrode may be formed by printing a conductive paste that contains nickel (Ni) or a nickel (Ni) alloy on the surface of the dielectric layer using screen printing or gravure printing. However, the present embodiment is not limited thereto.

For example, an average thickness of the first internal electrode 150 and the second internal electrode 160 may be about 0.1 μm or more and 2 μm or less, respectively.

According to the above-described configuration, electric charges accumulate between the first internal electrode 150 and the second internal electrode 160 that face each other, when a voltage is applied to the first external electrode 120 and the second external electrode 130. That is, capacitance can be obtained between the first internal electrode 150 electrically connected to the first external electrode 120 and the second internal electrode 160 electrically connected to the second external electrode 130. The capacitance of the multilayer ceramic capacitor 1000 is proportional to the overlap area in which the first internal electrode 150 and the second internal electrode 160 overlap each other along the thickness direction (T-axis direction).

In other words, the multilayer ceramic capacitor 1000 may include an active region and a margin region. The active region may refer to an area in which the first internal electrode 150 and the second internal electrode 160 overlap each other in the thickness direction (T-axis direction), and the margin region may refer to an area between the active region and the first surface S1 of the ceramic main body 110 and an area between the active region and the second surface S2 of the ceramic main body 110.

The multilayer ceramic capacitor 1000 is categorized based on its length and width. Therefore, even in multilayer ceramic capacitors with the same length or width, the size of the ceramic main body may vary depending on the thickness of the external electrode. In other words, a multilayer ceramic capacitor with a thinner external electrode may have a larger ceramic main body compared to a multilayer ceramic capacitor with a thicker external electrode. A larger ceramic main body means that the aforementioned active region is larger, which may further mean that the capacitance is larger. Therefore, as the external electrode of the multilayer ceramic capacitor becomes thinner, the capacitance may become greater. In the present embodiment, by forming the external electrode of the multilayer ceramic capacitor with a plating layer, the thickness of the external electrode may be made thinner and a corresponding advantageous effect can be obtained. This will be described in more detail below.

The first cover layer 143 and the second cover layer 145 may be disposed outside the active region in the thickness direction (T-axis direction).

The first cover layer 143 is disposed between the fifth surface S5 of the ceramic main body 110 and the internal electrode closest to the fifth surface S5. The second cover layer 145 is disposed between the sixth surface S6 of the ceramic main body 110 and the internal electrode closest to the sixth surface S6.

That is, the first cover layer 143 is disposed on an upper portion of the uppermost internal electrode in the ceramic main body 110, and the second cover layer 145 may be disposed on the lowermost internal electrode in the ceramic main body 110. The first cover layer 143 and the second cover layer 145 may have the same or different composition as the dielectric layer 140. The first cover layer 143 and the second cover layer 145 may be formed by stacking one or more dielectric layers on the outer surface of the uppermost internal electrode and the outer surface of the lowermost internal electrode, respectively.

The first cover layer 143 and the second cover layer 145 may serve to prevent damage to the first internal electrode 150 and the second internal electrode 160 by physical or chemical stress.

The dielectric layer 140 may include a ceramic material with high dielectric constant. For example, the ceramic material may include a dielectric ceramic material that contains a component such as $BaTiO_3$, $CaTiO_3$, $SrTiO_3$, or $CaZrO_3$, and the like. In addition, such a component may further include an auxiliary component such as a manganese (Mn) compound, an iron (Fe) compound, a chromium (Cr) compound, a cobalt (Co) compound, and a nickel (Ni) compound. For example, the dielectric layer may include $(Ba_{1-x}Ca_x)TiO_3$, $Ba(Ti_{1-y}Ca_y)O_3$, $(Ba_{1-x}Ca_x)(Ti_{1-y}Zr_y)O_3$, $Ba(Ti_{1-y}Zr_y)O_3$, or the like in which calcium (Ca), zirconium (Zr) or the like are partially dissolved in $BaTiO_3$, but the present embodiment is not limited thereto.

In addition, the dielectric layer 140 may include one or more of a ceramic additive, an organic solvent, a plasticizer, a coupling agent, and a dispersing agent. The ceramic additive may be, for example, a transition metal oxide or carbide, a rare earth element, magnesium (Mg), aluminum (Al), or the like.

For example, an average thickness of the dielectric layer 140 may be 0.1 μm to 10 μm, but the present embodiment is not limited thereto.

The first external electrode 120 and the second external electrode 130 are disposed outside the ceramic main body 110. The thickness of the first external electrode 120 and the second external electrode 130 may each be greater than 0 um and less than or equal to 1 um.

The first external electrode 120 is disposed on the first surface S1 of the ceramic main body 110 and may extend to the third surface S3, the fourth surface S4, the fifth surface S5, and the sixth surface S6. The second external electrode 130 is disposed on the second surface S2 of the ceramic main body 110 and may extend to the third surface S3, the fourth surface S4, the fifth surface S5, and the sixth surface S6. In other embodiments, the first external electrode 120 and the second external electrode 130 may each extend to at least one of the fifth surface S5 and the sixth surface S6.

The first external electrode 120 includes a first end portion 121, a first band portion 123, and a first edge portion 125.

The first end portion 121 is a portion that covers the first surface S1 of the ceramic main body 110 and is electrically connected to the exposed end of the plurality of first internal electrodes 150.

The first band portion 123 extends from the first end portion 121 and covers at least a portion of the third surface S3, the fourth surface S4, the fifth surface S5, and the sixth surface S6. The first band portion 123 may allow the first external electrode 120 to be more strongly adhered to the ceramic main body 110.

The first edge portion 125 may be a portion that connects the first end portion 121 and the first band portion 123.

The second external electrode 130 includes a second end portion 131, a second band portion 133, and a second edge portion 135.

The second end portion 131 is a portion that covers the second surface S2 of the ceramic main body 110 and is electrically connected to the exposed end of the plurality of second internal electrodes 160.

The second band portion 133 extends from the second end portion 131 and covers at least a portion of the third surface S3, the fourth surface S4, the fifth surface S5, and the sixth surface S6 of the ceramic main body 110. The second band portion 133 may allow the second external electrode 130 to be more strongly adhered to the ceramic main body 110.

The second edge portion 135 may be a portion that connects the second end portion 131 and the second band portion 133.

Based an optical microscope or scanning electron microscope (SEM) image of a cross-section taken in the length direction (L-axis direction) and thickness direction (T-axis direction) of a central portion of the ceramic main body 110 in the width direction (W-axis direction), the first end portion 121 and the second end portion 131 may have a shape substantially parallel to the thickness direction (T-axis direction), the first band portion 123 and the second band portion 133 may have a shape substantially parallel to the length direction (L-axis direction), and the first edge portion 125 and the second edge portion 135 may have a curved line shape, in the multilayer ceramic capacitor 1000 shown in the above-mentioned cross-section image. The above-described curved line shape may be a curved line shape with tangents whose slope changes from a direction parallel to the thickness direction (T-axis direction) to a direction parallel to the length direction (L-axis direction) (or vice versa).

Meanwhile, the first external electrode 120 may include a first plating layer 127 and the second external electrode 130 may include a second plating layer 137, and this will be described in detail hereinafter.

Figure 4:
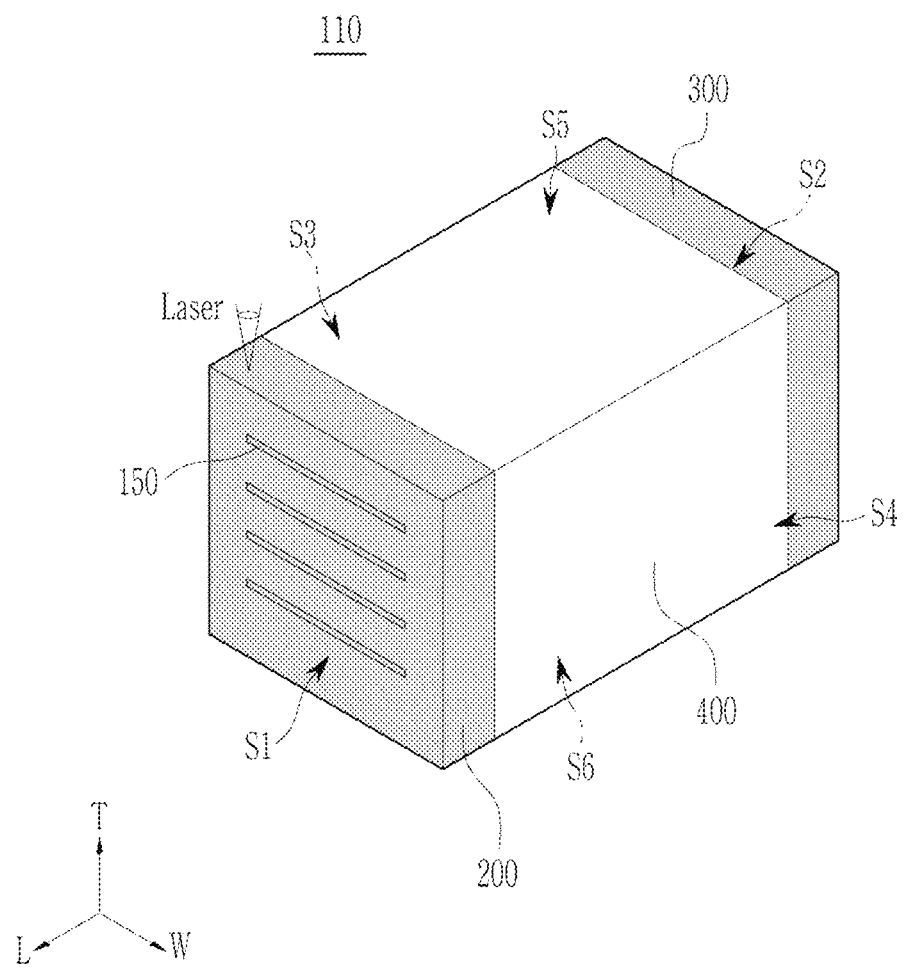
FIG. 4 is a perspective view of the laser irradiation of the multilayer ceramic capacitor of FIG. 1.

FIG. 4 is a perspective view of the laser irradiation of the multilayer ceramic capacitor of FIG. 1.

Referring to FIG. 4, the ceramic main body 110 may include a first laser irradiation region 200, a second laser irradiation region 300, and a laser non-irradiated region 400, and the first laser irradiation region 200 and the second laser irradiation region 300 are irradiated with lasers. The laser irradiated here may be a femtosecond laser, but the present embodiment is not limited thereto.

After laser irradiation is completed, a plating process may be performed on the first laser irradiation region 200 to form the first plating layer 127, and a plating process may be performed on the second laser irradiation region 300 to form the second plating layer 137. That is, the first laser irradiation region 200 is a region in which the first external electrode 120 is to be formed, and the second laser irradiation region 300 is a region in which the second external electrode 130 is to be formed.

For example, the first laser irradiation region 200 may include the first surface S1 and portions of third surface S3, the fourth surface S4, the fifth surface S5, and the sixth surface S6 of the ceramic main body 110, and the second laser irradiation region 300 may include the second surface S2 and portions of the second surface S2, the third surface S3, the fourth surface S4, the fifth surface S5, and the sixth side S of the ceramic main body 110. However, the present embodiment is not limited thereto, and the range of the laser irradiation region may vary depending on the shape of the external electrode to be formed in the later state.

The laser non-irradiated region 400 is a portion of the ceramic main body 110, excluding the first laser irradiation region 200 and the second laser irradiation region 300. The laser non-irradiated region 400 includes not only the surface of the ceramic main body 110 but also the inner region, i.e., the lower regions of the first laser irradiation region 200 and the second laser irradiation region 300.

The first laser irradiation region 200 and the second laser irradiation region 300 may have lower electrical resistance than the rest of the ceramic main body 110. That is, the electrical resistance of the surface of the first laser irradiation region 200 may be smaller than the electrical resistance of the surface of the laser non-irradiated region 400, and the electrical resistance of the surface of the second laser irradiation region 300 may be smaller than that of the surface of the laser non-irradiated region 400. For example, the ratio of the electrical resistance of the surface of the first laser irradiation region 200 (or second laser irradiation region 300) to the electrical resistance of the surface of the laser non-irradiated region 400 may be $1/10^4$ or more and less than 1.

Since the first laser irradiation region 200 and the second laser irradiation region 300 have relatively low electrical resistance, when forming a plating layer with electroplating, the reduction reaction of the metal in the first laser irradiation region 200 and the second laser irradiation region 300 may occur more easily than in the laser non-irradiated region 400. Accordingly, plating metal may be precipitated more quickly and easily from the first laser irradiation region 200 and the second laser irradiation region 300.

Figure 5:
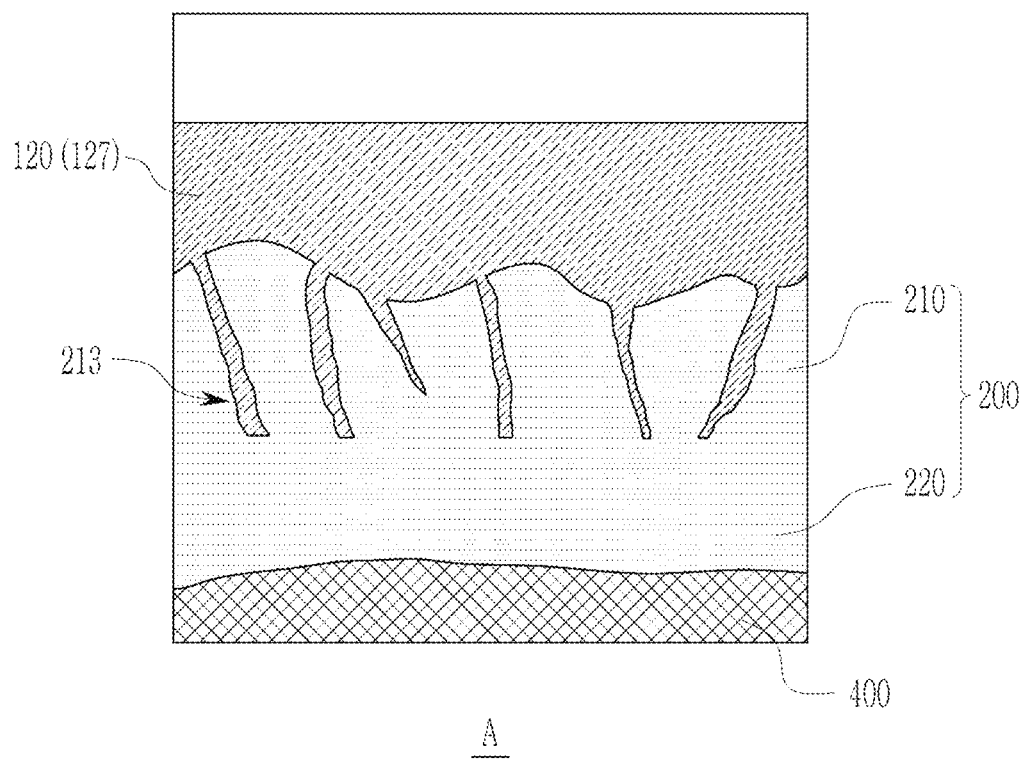
FIG. 5 is an enlarged view of the area A of FIG. 2.

FIG. 5 is an enlarged view of the area A of FIG. 2.

Referring to FIG. 5 together with FIG. 2, the first external electrode 120 includes the first plating layer 127, and the first plating layer 127 may be disposed in the first laser irradiation region 200 of the ceramic main body 110.

The first plating layer 127 may be formed by directly plating a conductive metal on the first laser irradiation region 200. Here, the conductive metal may include nickel (Ni), copper (Cu), tin (Sn), palladium (Pd), platinum (Pt), gold (Au), silver (Ag), tungsten (W), titanium (Ti), or lead (Pb), alone or an alloy thereof, but the present embodiment is not limited thereto.

The second plating layer 137 is the same as the first plating layer 127 in structure and composition, except for the location, and therefore redundant description thereof will be omitted.

The first laser irradiation region 200 may include an outer layer portion 210 and an inner layer portion 220. Since the second plating layer 137 has the same structure and composition as the first plating layer 127 except for its location, the following description will mainly focus on first laser irradiation region 200.

The outer layer portion 210 is a portion that forms an external surface of the first laser irradiation region 200 and is in contact with the first plating layer 127. Micro cracks 213 exist in the outer layer portion 210. The micro crack 213 may be generated by melting and rapid cooling of the outer layer portion 210 by laser irradiation. For example, the micro crack 213 may have a dept of 10 nm or more and 1000 nm or less. If the depth of the micro crack 213 is less than 10 nm, the adhesion of the plating layer may be weak, and if it exceeds 1000 nm, there is a risk of affecting the internal electrode of the multilayer ceramic capacitor.

The presence and depth of micro crack 213 are observed and measured based on a field emission (FE) type scanning electron microscope (SEM) (acceleration voltage: 5 kV) image of a cross section taken in the length direction (L-axis direction) and thickness direction (T-axis direction) of a central portion of the multilayer ceramic capacitor 1000 in the width direction (W-axis direction). The depth of micro crack 213 may be measured by a standard method that will be apparent to and understood by one of ordinary skill in the art.

The micro crack 213 of the outer layer portion 210 is filled with a metal that forms the first plating layer 127. In other words, the plating metal may grow from inside the micro crack 213 to form the first plating layer 127. In this case, compared to the case where no micro cracks exist, a contact area between the plating layer and the outer layer portion is wider, and therefore the plating layer can be more strongly bonded to the ceramic main body.

The inner layer portion 220 is a portion that forms an internal surface of the first laser irradiation region 200 and is in contact with the laser non-irradiated region 400. No micro crack exists in the inner layer portion 220.

Meanwhile, the first laser irradiation region 200 may include an amorphous structure. In contrast, the remaining portion of the ceramic main body 110 may have a lattice structure. In other words, as a result of laser irradiation on the surface of the ceramic main body 110, the lattice structure of the corresponding region may be reformed into an amorphous structure. In a lattice structure, the proportions of specific elements within the structure cannot be increased beyond a certain level in order to maintain electrostatic equilibrium and stoichiometry, whereas the amorphous structure in the laser irradiation region does not have such a limitation, so the proportions of certain elements within the amorphous structure may be increased. In other words, when a laser is irradiated to a laser irradiation region, the micro structure of the region changes from a lattice structure to an amorphous structure, creating surplus electrons or holes that did not exist before and reducing the band gap energy within the structure, similar to the effect of doping a semiconductor. Thus, when the laser irradiation region is irradiated with a laser, an energy barrier for metal precipitation (reduction reaction) during plating is lowered, and the structure can be changed to one that is more susceptible to plating.

The ceramic main body 110 includes barium (Ba) and titanium (Ti), and a ratio (Ba/Ti) of the content of barium (Ba) (unit: at %) to the content of titanium (Ti) (unit: at %) in the first laser irradiation region 200 may be smaller than a ratio (Ba/Ti) of the content of titanium (Ti) to the content of barium (Ba) in the laser non-irradiated region. That is, the first laser irradiation region 200 may be a region relatively rich in titanium (Ti) compared to the laser non-irradiated region. Since titanium is relatively abundant in the laser irradiation region, the band gap in the region may be reduced or the electrical resistance of the surface of the region may be reduced.

For example, the ratio (Ba/Ti) of the content of barium (Ba) (unit: at %) to the content of titanium (Ti) (unit: at %) in the first laser irradiation region 200 is 0.01 or more and 0.02 or less, but the ratio (Ba/Ti) of the content of titanium (Ti) to the content of barium (Ba) in the laser non-irradiated region may be 0.9 or more and 1.1 or less.

Figure 6:
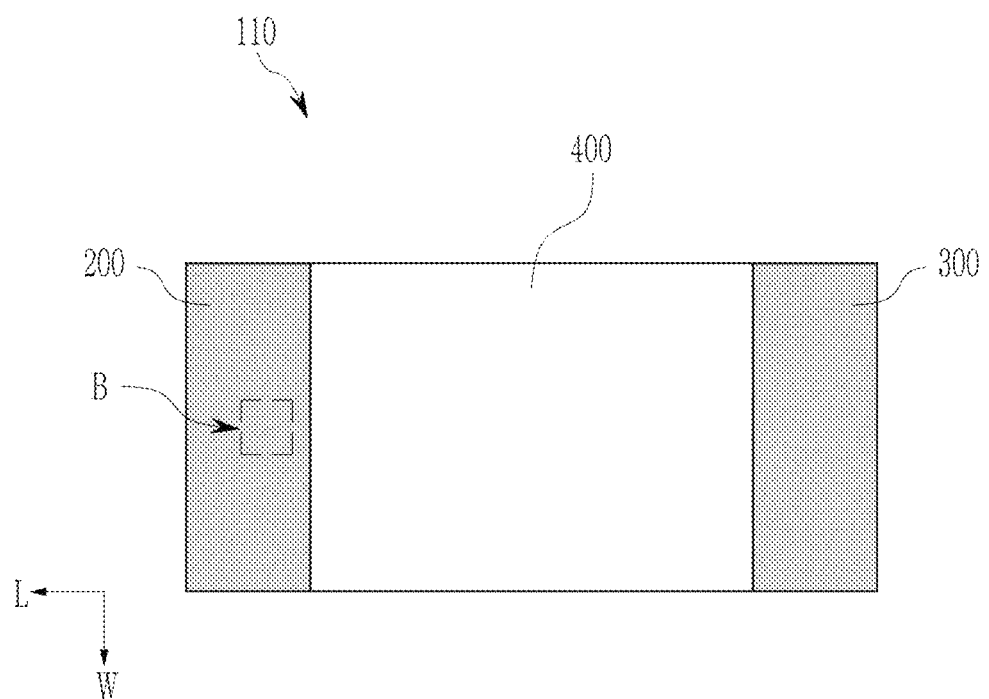
FIG. 6 is a top plan view of the laser irradiation region of the multilayer ceramic capacitor of FIG. 1.
Figure 7:
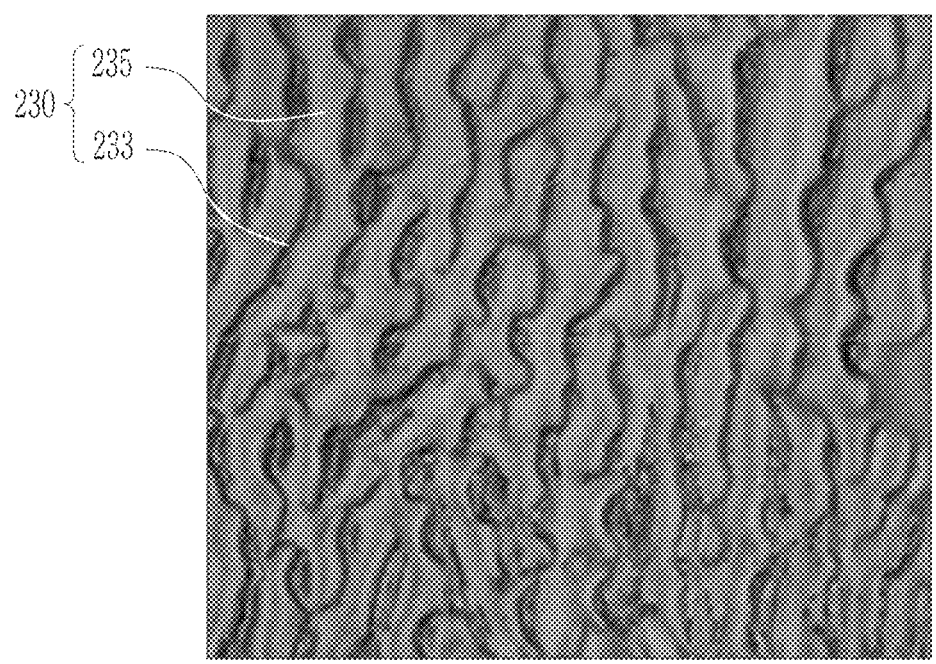
FIG. 7 is an enlarged view of the area B in FIG. 6.
Figure 8:
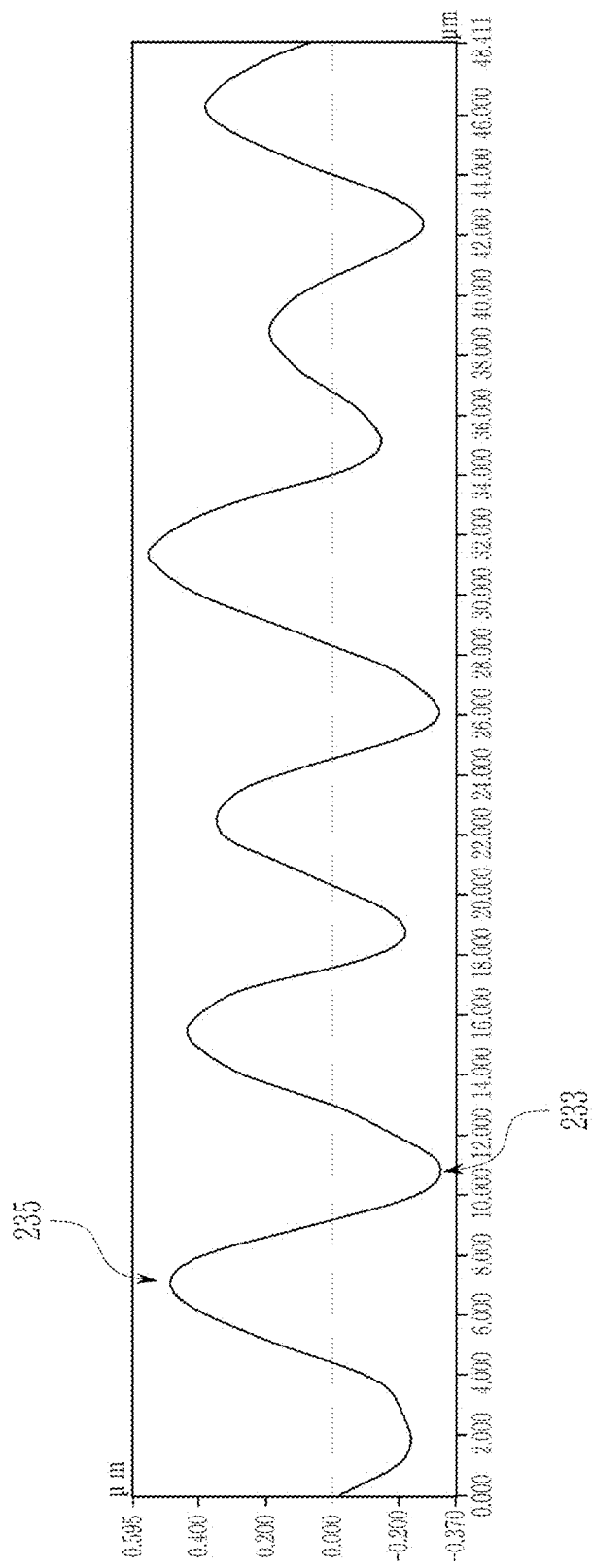
FIG. 8 is a view illustrating the shape of a curved portion of FIG. 7.

FIG. 6 is a top plan view of the laser irradiation region of the multilayer ceramic capacitor of FIG. 1, FIG. 7 is an enlarged view of the area B in FIG. 6, and FIG. 8 is a view illustrating the shape of a curved portion of FIG. 7.

Referring to FIG. 6, FIG. 7, and FIG. 8, the first laser irradiation region 200 may include a curved portion 230, and the curved portion 230 may include a pattern of irregularities including repeating valleys 233 and ridges 235.

The profile of the valleys 233 and the ridges 235 of the curved portion 230 may be measured using the focus variation mode or confocal laser mode of a 3-dimensional profiler (3D profiler). For example, the average profile of more than 200 line segments that connect the valleys or ridges can be measured. The average period of the valleys or ridges may be 0.1 um or more and 8 um or less, and the average amplitude may be 0.01 um or more and 1 um or less.

The above-mentioned micro cracks 213 may exist in the ridge 235, and the electrical resistance in the ridge 235 may be smaller than that in the valley 233.

The curved portion 230 exists in the first laser irradiation region 200, and therefore a moisture penetration path may be prolonged, thereby improving the moisture resistance reliability of the multilayer ceramic capacitor 1000. In addition, since a specific surface area of the first plating layer 127 of the first external electrode 120 and the first laser irradiation region 200 increases due to the presence of the curved portion 230, the adhesion strength of the first plating layer 127 may be improved.

As in the present embodiment, forming a plating layer after laser irradiation on a ceramic surface may result in a thin external electrode. For example, the external electrode may have a thickness greater than 0 um and less than or equal to 1 um. When the external electrode is thin, the portion that contributes to the capacitance can be increased, thereby improving the performance of the multilayer ceramic capacitor.

Furthermore, in the present embodiment, micro cracks are formed on the surface of the ceramic main body that is irradiated with laser and the micro cracks are filled with the plating layer, and thus the plating layer can be strongly bonded to the surface of the ceramic main body.

However, unlike the present embodiment, when a plating layer is formed on the base electrode formed by dipping and blotting the ceramic main body in a conductive paste, the sum of the thicknesses of the base electrode and the plating layer may be about 10 um or more, which is larger than the thickness of the external electrode (greater than 0 um and less than or equal to 1 um) according to the present embodiment. Compared to the present embodiment, when the external electrode is relatively thick and the volume occupied by the external electrode is large, the size of the portion that contributes to capacitance is relatively reduced, thereby deteriorating the performance of the multilayer ceramic capacitor.

In addition, unlike the present embodiment, when a metal thin film is formed without laser irradiation on the ceramic surface and then a plating layer is formed using the metal thin film as a seed layer, the seed layer may peel off during the plating layer formation process, causing poor plating.

Hereinafter, detailed embodiments of the invention will be disclosed. However, the embodiments described below are only for illustration or description for the invention in detail, and should not limit the scope of the invention.

Preparation Example: Manufacture of Multilayer Ceramic Capacitor

Example

A paste containing barium titanate ($BaTiO_3$) powder is applied on a carrier film and dried to prepare a plurality of dielectric green sheets.

A conductive paste containing nickel (Ni) is applied on the dielectric green sheet using screen printing to form a conductive paste layer.

A dielectric green sheet laminate is manufactured by stacking multiple layers of dielectric green sheets while ensuring that at least portions of the conductive paste layers overlap.

The dielectric green sheet laminate is cut into individual chips, maintained at 350° C. for 66 hours in an atmospheric atmosphere for binder removal, and fired at 1165° C. to manufacture the ceramic main body.

Next, a femtosecond laser is irradiated to the laser irradiation region of the ceramic main body, forming a pattern of irregularities having a period of 0.1 um or more and 8 um or less and an amplitude of 0.01 um or more and 1 um or less.

Next, a copper (Cu) plating layer is formed in the laser irradiation region to manufacture a multilayer ceramic capacitor.

Comparative Example

A paste containing barium titanate ($BaTiO_3$) powder is applied on a carrier film and dried to prepare a plurality of dielectric green sheets.

A conductive paste containing nickel (Ni) is applied on the dielectric green sheet using screen printing to form a conductive paste layer.

A dielectric green sheet laminate is manufactured by stacking multiple layers of dielectric green sheets while ensuring that at least portion of the conductive paste layers overlap.

The dielectric material green sheet laminate is cut into individual chips, maintained at 350° C. for 66 hours in an atmospheric atmosphere for binder removal, and fired at 1165° C. to manufacture the ceramic main body.

Next, the ceramic main body is dipped and blotted in a slurry containing a glass frit and copper (Cu), then thermally dried and sintered at 820° C. for 60 minutes, forming a base electrode.

Then, nickel (Ni) and tin (Sn) plating is performed to manufacture a multilayer ceramic capacitor.

Experimental Example: Performance of Multilayer Ceramic Capacitor

The thickness, surface resistance, and ratio (Ba/Ti) of barium (Ba) content to titanium (Ti) content of the external electrode of the multilayer ceramic capacitor manufactured in the Example and Comparative Example are measured and the presence of an amorphous structure is determined.

1) Method for Measuring the Thickness of External Electrode

Each of five manufactured multilayer ceramic capacitors is mounted in an epoxy mold, and surfaces in the L-axis direction and T-axis direction are polished to a depth of about ½ along the W-axis direction and finished with diamond paste to prepare cross-section samples.

In the prepared cross-section sample, the location where a first or second external electrode is visible at approximately 70 μm in a direction from the interface of the first or second external electrode and the ceramic main body to the plating layer is measured using a metallurgical optical microscope (OM) in a Bright Field mode and analysis magnification of 500 times.

2) Method for Measuring the Surface Resistance

Electrical resistance of the surface is measured with AFM (Dimension ICON)/AFM Probe: DDESP-V2/material: conductive diamond coated/scan area: 20×20 $um^2$/Scan speed: <0.3 Hz/line direction: retrace/microscope mode: SSRM mode and condition. Here, bias is limited to 10V and contact force is limited to 10 uN.

3) Method for Identifying the Amorphous Structure

Each of five manufactured multilayer ceramic capacitors is mounted in an epoxy mold, and surfaces in the L-axis direction and T-axis direction are polished to a depth of about ½ along the W-axis direction and finished with diamond paste to prepare cross-section samples.

In the prepared cross-section sample, the location where a first or second external electrode is visible at approximately 70 μm in a direction from the interface of the first or second external electrode and the ceramic main body to the plating layer is measured using field emission (FE)-transmission electron microscope (TEM), and the diffraction patterns in the laser irradiation region and the laser non-irradiated region are compared and observed to determine the presence of an amorphous structure.

For example, a STEM image is observed using a condenser lens aperture at 200 kV with JEOL-ARM200F, and the diffraction patterns are observed using the condenser lens aperture 100 um at 200 kV in BF mode.

4) Method for Measuring Ba/Ti

Each of five manufactured multilayer ceramic capacitors is mounted in an epoxy mold, and surfaces in the L-axis direction and T-axis direction are polished to a depth of about ½ along the W-axis direction and finished with diamond paste to prepare cross-section samples.

In the prepared cross-section sample, the location where a first or second external electrode is visible at approximately 70 μm in a direction from the interface of the first or second external electrode and the ceramic main body to the plating layer is measured using a field emission (FE)-transmission electron microscope (TEM), and energy dispersive spectroscopy (EDS) is carried out to calculate a ratio (Ba/Ti) of the content of barium (Ba) (unit: at %) to the content of titanium (Ti) (unit: at %).

For example, a STEM image is observed using a condenser lens aperture at 200 kV with JEOL-ARM200F, and the energy dispersive spectroscopy is performed with Oxford's X-max.

The results of measuring the thickness and surface resistance of the external electrode of the multilayer ceramic capacitor manufactured in the Example and Comparative Example and determining the presence of an amorphous structure are shown in Table 1.

TABLE 1

|  |  | Example | Comparative Example |
|---|---|---|---|
| Thickness of external electrode (μm) |  | greater than 0 and less than or equal to 1 | 10 or more and 40 or less |
| Surface electrical resistance (Ohm) | Laser irradiation region | $10^8$ or more and $10^{12}$ or less | — |
|  | Laser non-irradiated region | $10^{12}$ | $10^{12}$ |
| Amorphous structure | Laser irradiation region | Present | — |
|  | Laser non-irradiated region | Not present | Not present |

Referring to Table 1, it can be confirmed that the thickness of the external electrode at the end portion of the multilayer ceramic capacitor manufactured in the Example is greater than 0 μm and less than or equal to 1 μm. On the other hand, it can be confirmed that the thickness of the external electrode of the multilayer ceramic capacitor manufactured in the Comparative Example is 10 μm or more and 40 μm or less. As such, the thickness of the external electrode of the multilayer ceramic capacitor manufactured in the Example is less than 10 μm, which is smaller than the thickness of the external electrode of the multilayer ceramic capacitor manufactured in the Comparative Example.

Therefore, when the size of the multilayer ceramic capacitor is the same, the external electrode according to the embodiment can be made thinner and the volume of the portion that contributes to capacitance, such as the internal electrode and dielectric layer, can be made larger. That is, according to the embodiment, by reducing the volume of the external electrode, the portion that contributes to capacitance can be made larger.

In addition, it can be confirmed that the surface electrical resistance of the laser irradiation region of the multilayer ceramic capacitor manufactured in the Example is smaller than the electrical resistance of the surface of the laser non-irradiated region.

In addition, it can be confirmed that an amorphous structure exists in the laser irradiation region and does not exist in the laser non-irradiated region of the multilayer ceramic capacitor manufactured in the Example.

FIG. 9 to FIG. 12 show the FE-TEM analysis images and the EDS analysis results according to the embodiment, and Table 2 shows the results of measuring Ba/Ti in the selected areas of each figure.

TABLE 2

Figure 9:
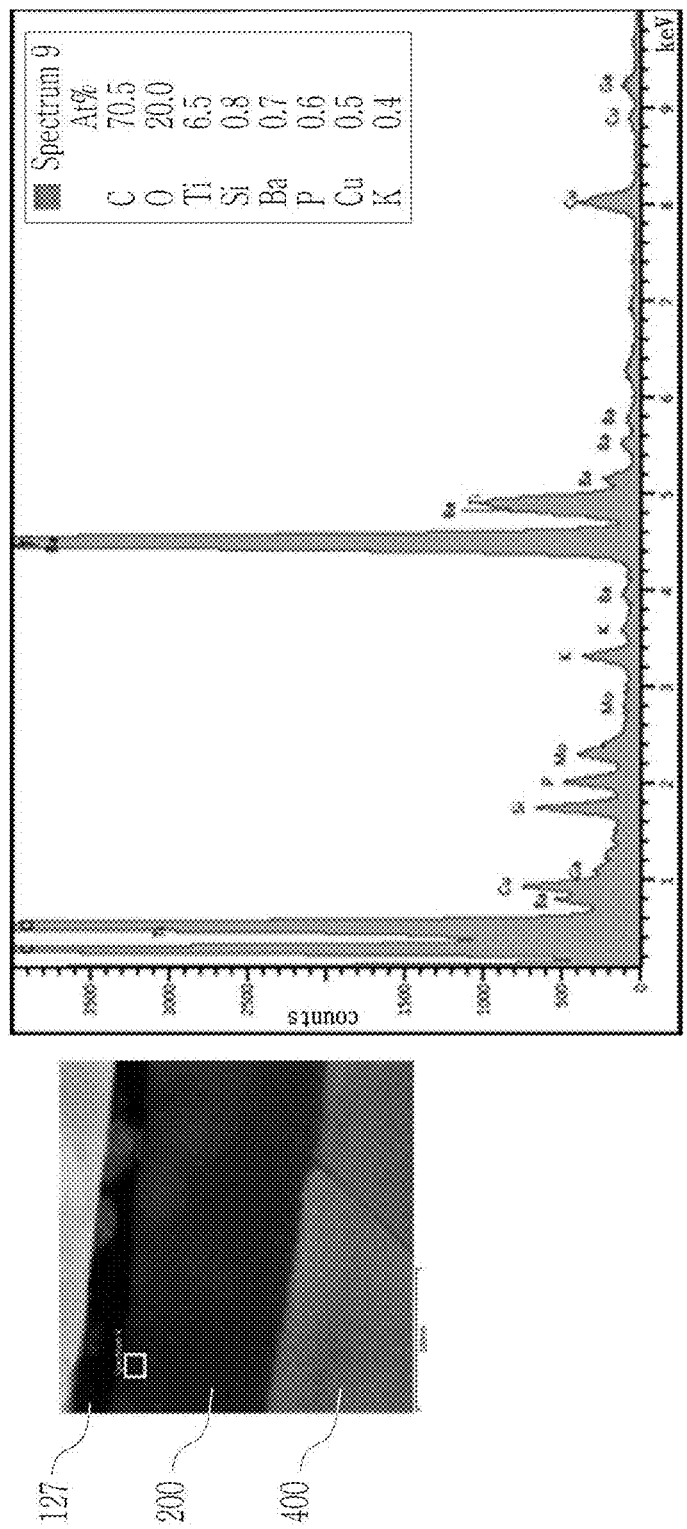
FIG. 9, FIG. 10, FIG. 11 and FIG. 12 show a field emission (FE)-transmission electron microscope (TEM) analysis images and energy dispersive spectroscopy (EDS) elemental analysis results, according to the embodiment.
Figure 10:
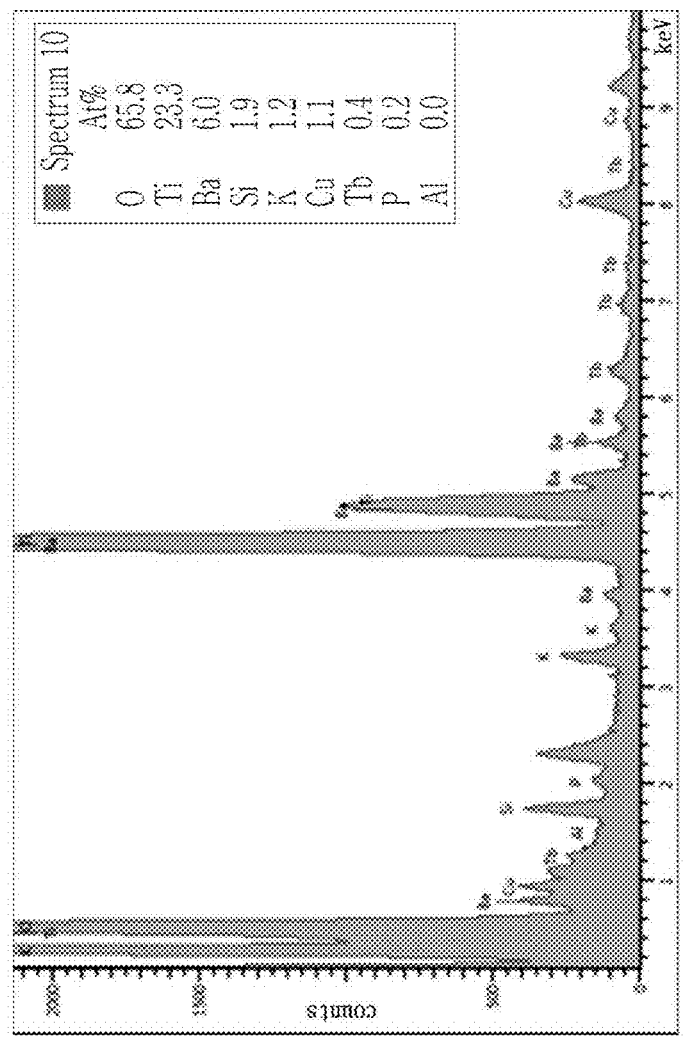
Figure 10:
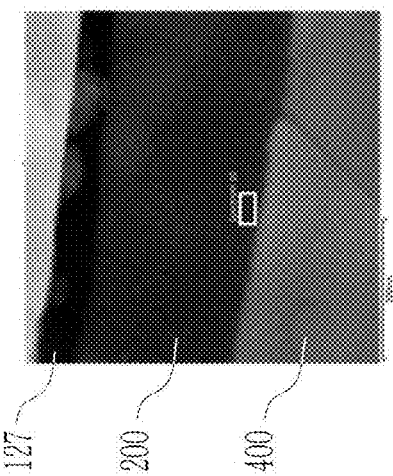
Figure 11:
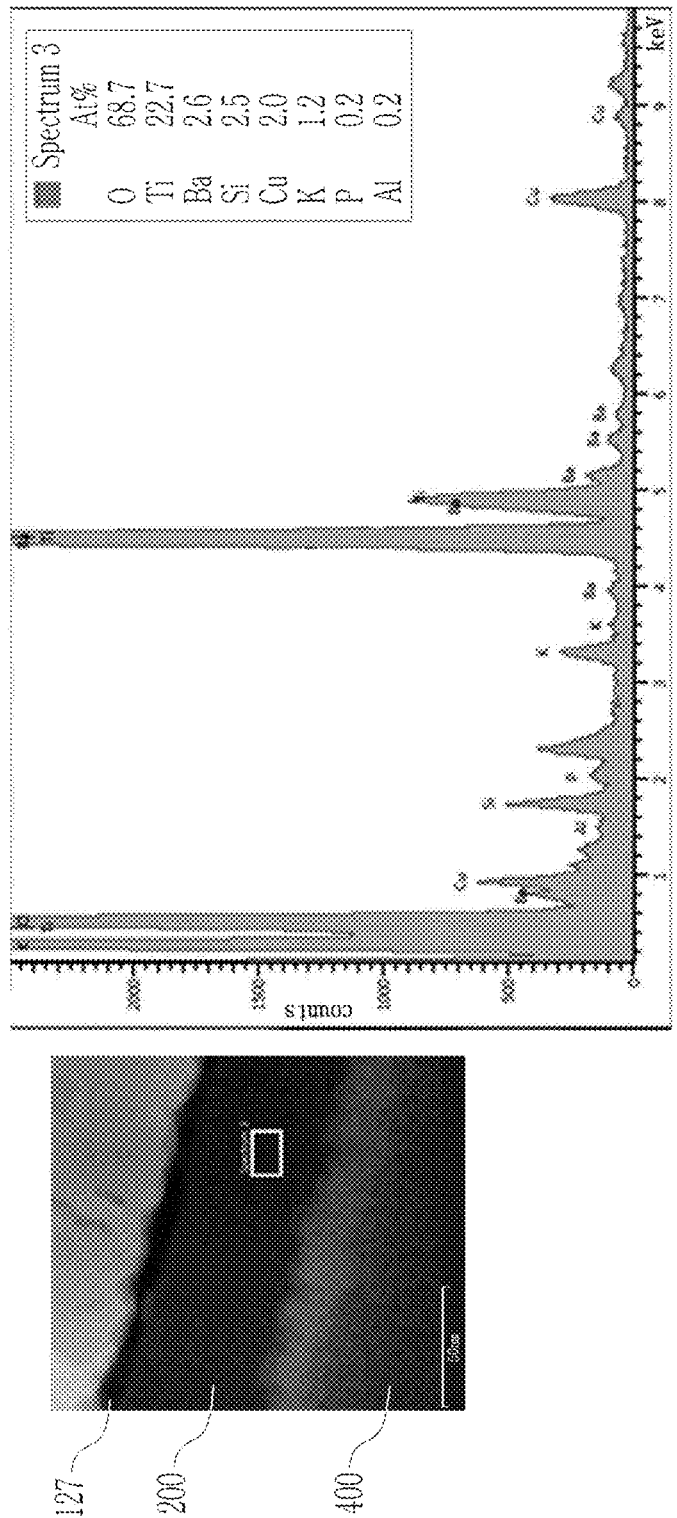
Figure 12:
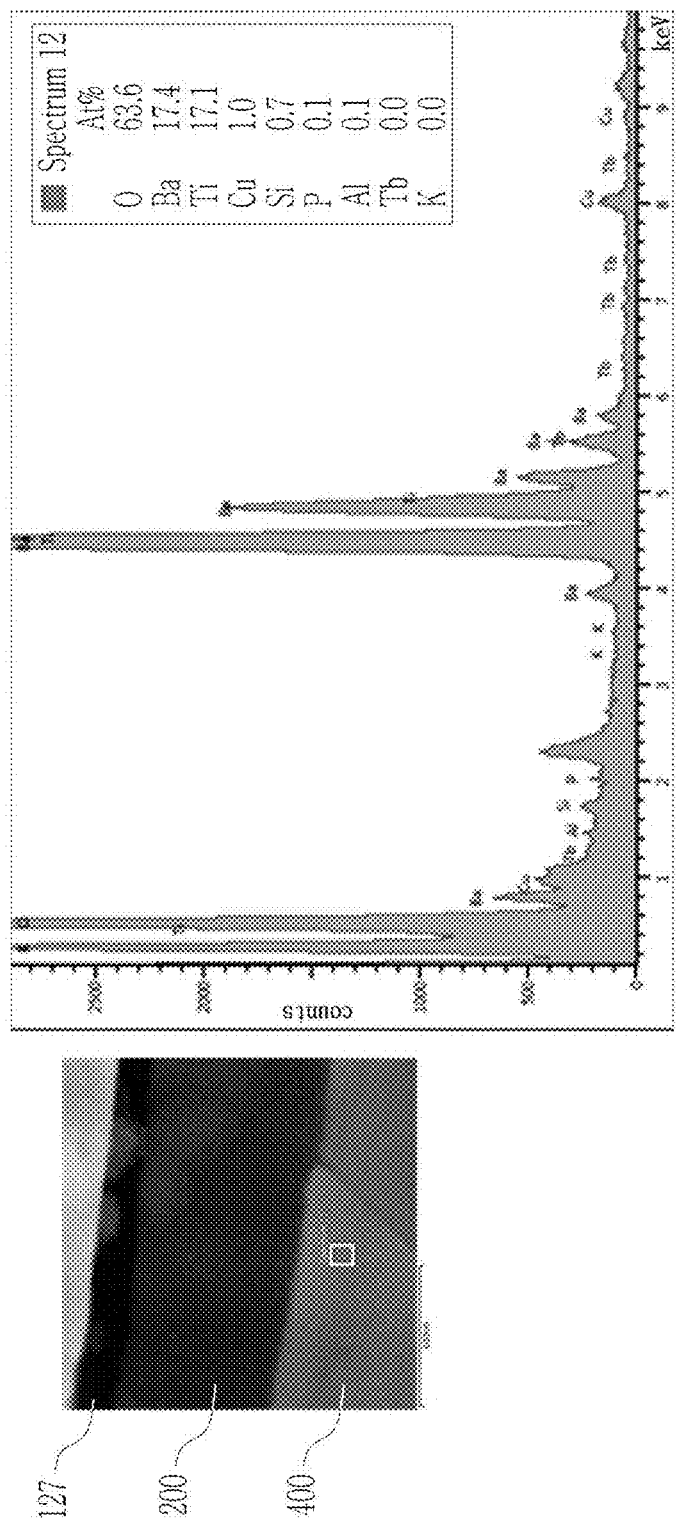

|  |  | Ti (at %) | Ba (at %) | Ba/Ti |
| --- | --- | --- | --- | --- |
| Laser irradiation region | FIG. 9 | 6.5 | 0.7 | 0.1077 |
|  | FIG. 10 | 23.3 | 6.0 | 0.2575 |
|  | FIG. 11 | 22.7 | 2.6 | 0.1145 |
| Laser non-irradiated region | FIG. 12 | 17.1 | 17.4 | 1.0175 |

Referring to FIG. 9 to FIG. 12 and Table 2, in the multilayer ceramic capacitor manufactured in the embodiment, the ratio (Ba/Ti) of the barium (Ba) content to the titanium (Ti) content in the laser irradiation region is smaller than the ratio (Ba/Ti) of the barium (Ba) content to the titanium (Ti) content in the laser non-irradiated region. In other words, it can be confirmed that the laser irradiation region is relatively rich in titanium (Ti).

While this invention has been described in connection with what is presently considered to be practical embodiments, it is to be understood that the invention is not limited to the disclosed embodiments. On the contrary, it is intended to cover various modifications and equivalent arrangements included within the spirit and scope of the appended claims.

What is claimed is:

1. A multilayer ceramic capacitor comprising:
a ceramic main body;
an internal electrode disposed inside the ceramic main body; and
an external electrode including a plating layer that contacts a surface of the ceramic main body and is connected to the internal electrode,
wherein a micro crack exists inward from a surface of the ceramic main body where the plating layer is in contact, and the micro crack is filled with a metal that comprises the plating layer, and
the surface of the ceramic main body, which is in contact with the plating layer, includes an amorphous structure.

2. The ceramic capacitor of claim 1, wherein:
the surface of the ceramic main body, which is in contact with the plating layer, comprises a curved portion.

3. The ceramic capacitor of claim 2, wherein:
the curved portion comprises a pattern of irregularities including repeating valleys and ridges, and
an average period of the valleys or the ridges is 0.1 um or more and 8 um or less and an average amplitude is 0.01 um or more and 1 um or less.

4. The ceramic capacitor of claim 2, wherein:
the curved portion comprises valleys and ridges, and
the micro crack exists in the ridges.

5. The ceramic capacitor of claim 1, wherein:
a depth of the micro crack is 10 nm or more and 1000 nm or less.

6. The ceramic capacitor of claim 1, wherein:
the ceramic main body includes barium (Ba) and titanium (Ti), and
a ratio (Ba/Ti) of the content of titanium (Ti) to the content of titanium (Ti) in the amorphous structure is smaller than a ratio (Ba/Ti) of the content of barium (Ba) to the content of titanium (Ti) in remaining regions of the ceramic main body.

7. The ceramic capacitor of claim 1, wherein:
electrical resistance of the surface of the ceramic main body that is in contact with the plating layer is smaller than electrical resistance of a surface that is not in contact with the plating layer.

8. The ceramic capacitor of claim 7, wherein:
a ratio of the electrical resistance of the surface of the ceramic main body that is in contact with the plating layer to the electrical resistance of the ceramic surface that is not in contact with the plating layer is greater than or equal to $1/10^4$ and less than 1.

9. The ceramic capacitor of claim 2, wherein:
the curved portion comprises valleys and ridges, and
electrical resistance of the ridges is smaller than electrical resistance of the valleys.

10. The ceramic capacitor of claim 1, wherein:
a thickness of the plating layer is greater than 0 um and less than or equal to 1 um.

11. The ceramic capacitor of claim 1, wherein:
the surface of the ceramic main body that is in contact with the plating layer includes a laser irradiation region having a certain depth, and a surface of the ceramic main body that is not in contact with the plating layer includes a laser non-irradiated region.

12. The ceramic capacitor of claim 11, wherein:
electrical resistance of the laser irradiation region is smaller than electrical resistance of the laser non-irradiated region.

13. The ceramic capacitor of claim 11, wherein:
the ceramic main body includes barium (Ba) and titanium (Ti), and
a ratio (Ba/Ti) of the content of titanium (Ti) to the content of titanium (Ti) in the amorphous structure in the laser irradiation region is smaller than a ratio (Ba/Ti) of the content of barium (Ba) to the content of titanium (Ti) in the laser non-irradiated region.

14. The ceramic capacitor of claim 11, wherein:
the laser irradiation region includes an outer layer portion and an inner layer portion,
the outer layer portion is a portion that forms an external surface of the laser irradiation region and is in contact with the plating layer, the micro crack exists in the outer layer portion,
the inner layer portion is a portion that forms an internal surface of the laser irradiation region and is in contact with the laser non-irradiated region, and
no micro crack exists in the inner layer portion.

* * * * *